US012810668B2

(12) United States Patent
Inaba

(10) Patent No.: US 12,810,668 B2
(45) Date of Patent: Nov. 24, 2026

(54) SMART ENTRY SYSTEM, CENTRAL DEVICE, SMART ENTRY PROGRAM, AND SMART ENTRY METHOD

(71) Applicant: Sumitomo Electric Industries, Ltd., Osaka (JP)

(72) Inventor: Tatsushige Inaba, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 35 days.

(21) Appl. No.: 18/028,829

(22) PCT Filed: Aug. 5, 2021

(86) PCT No.: PCT/JP2021/029045
§ 371 (c)(1),
(2) Date: Mar. 28, 2023

(87) PCT Pub. No.: WO2022/123822
PCT Pub. Date: Jun. 16, 2022

(65) Prior Publication Data
US 2024/0021033 A1 Jan. 18, 2024

(30) Foreign Application Priority Data
Dec. 11, 2020 (JP) ................................ 2020-205465

(51) Int. Cl.
*G07C 9/00* (2020.01)
*G07C 9/27* (2020.01)

(52) U.S. Cl.
CPC ..... *G07C 9/00309* (2013.01); *G07C 9/00571* (2013.01); *G07C 9/27* (2020.01); *G07C 2009/00412* (2013.01); *G07C 2009/00555* (2013.01)

(58) Field of Classification Search
CPC .. G07C 9/00309; G07C 9/00571; G07C 9/27; G07C 2009/00412; G07C 2009/00555; G07C 2209/63
See application file for complete search history.

(56) References Cited

U.S. PATENT DOCUMENTS 9,160,519 B1 * 10/2015 Leong .................... H04W 12/06
9,800,610 B1 * 10/2017 Lu ........................ H04W 12/128
9,875,589 B1 * 1/2018 Buttolo .............. G07C 9/00571
(Continued)

FOREIGN PATENT DOCUMENTS

JP 2008-127887 A 6/2008
JP 2012-060482 A 3/2012
(Continued)

*Primary Examiner* — Vernal U Brown
(74) *Attorney, Agent, or Firm* — XSENSUS LLP

(57) ABSTRACT

A smart entry system includes a central device, and a peripheral device configured to transmit a radio wave to the central device. The central device includes: a communication unit configured to receive the radio wave; a measurement unit configured to measure a value regarding the radio wave; and a determination unit configured to evaluate validity of the radio wave, based on a plurality of kinds of measurement results obtained by the measurement unit, and on a criterion based on distribution of the respective measurement results acquired in advance, and determine whether or not to permit entry, based on a result of the evaluation.

16 Claims, 6 Drawing Sheets

(56) References Cited

U.S. PATENT DOCUMENTS

| | | | | |
|---|---|---|---|---|
| 2008/0106375 | A1* | 5/2008 | Nakajima | B60R 25/245 340/5.72 |
| 2010/0191973 | A1* | 7/2010 | Huntzicker | H04W 12/069 713/176 |
| 2018/0326946 | A1 | 11/2018 | Bocca et al. | |
| 2021/0160812 | A1* | 5/2021 | Manolakos | H04W 64/00 |
| 2021/0248853 | A1* | 8/2021 | Vilhelmsen | G07C 9/27 |
| 2021/0400492 | A1* | 12/2021 | Movva | H04W 12/069 |
| 2022/0036254 | A1* | 2/2022 | Varughese | G07B 15/00 |
| 2022/0214419 | A1 | 7/2022 | Ryu et al. | |
| 2022/0379844 | A1 | 12/2022 | Mori | |
| 2022/0417752 | A1 | 12/2022 | Mori | |

FOREIGN PATENT DOCUMENTS

| | | | |
|---|---|---|---|
| JP | 2017-007365 | A | 1/2017 |
| JP | 2019-100055 | A | 6/2019 |
| JP | 6653985 | B1 | 2/2020 |
| JP | 6653986 | B1 | 2/2020 |
| JP | 2020-521073 | A | 7/2020 |
| KR | 10-2020-0125524 | A | 11/2020 |

* cited by examiner

FIG. 6

| ID OF PERIPHERAL DEVICE | PARAMETER GROUP | | | | |
|---|---|---|---|---|---|
| | $\sigma_{RSSI}^{RTT}$ | $\sigma_{RSSI,RTT}$ | $\sigma_{RSSI,RTT}$ | $\sigma_{RTT}^{RTT}$ | thr |
| K001 | p001_00 | p001_01 | p001_10 | p001_11 | thr001 |
| K002 | p002_00 | p002_01 | p002_10 | p002_11 | thr002 |
| K003 | p003_00 | p003_01 | p003_10 | p003_11 | thr003 |
| ... | ... | ... | ... | ... | ... |
| ... | ... | ... | ... | ... | ... |

SMART ENTRY SYSTEM, CENTRAL DEVICE, SMART ENTRY PROGRAM, AND SMART ENTRY METHOD

CROSS-REFERENCE TO RELATED APPLICATIONS

The present application is based on PCT/JP2021/029045, filed Aug. 5, 2021, which claims priority to Japanese Patent Application No. 2020-205465, filed Dec. 11, 2020, the entire contents of each are incorporated herein by reference.

TECHNICAL FIELD

The present disclosure relates to a smart entry system, a central device, a smart entry program, and a smart entry method.

BACKGROUND ART

PATENT LITERATURE 1 (Japanese Patent No. 6653986) discloses a relay attack determination device as follows. That is, this relay attack determination device is a device for determining relay attack in which wireless communication between an in-vehicle device and a portable device is relayed by a relay device. The relay attack determination device includes: a transmitter disposed on the in-vehicle device and configured to transmit a first signal and a second signal having an output condition different from that of the first signal; a receiver disposed on the portable device and configured to receive the first signal and the second signal; a strength meter disposed on the portable device and configured to measure, multiple times, a reception strength of each of the first signal and the second signal received by the receiver; a comparator configured to perform a comparative process of comparing the first signal and the second signal, based on an average of the reception strength measured by the strength meter; a determiner configured to determine the relay attack, based on a result of the comparative process; and a dispersion calculator configured to calculate a dispersion in the reception strength measured multiple times by the strength meter, with respect to the signal having the lower reception strength out of the first signal and the second signal. When the dispersion in the reception strength exceeds a threshold value indicating communication abnormality, the determiner determines the relay attack regardless of the result of the comparative process.

Meanwhile, PATENT LITERATURE 2 (Japanese Patent No. 6653985) discloses a relay attack determination device as follows. That is, this relay attack determination device is a device for determining relay attack in which wireless communication between an in-vehicle device and a portable device is relayed by a relay device. The relay attack determination device includes: a transmitter disposed on the in-vehicle device and configured to transmit a first signal and a second signal having an output condition different from that of the first signal; a receiver disposed on the portable device and including an antenna with a plurality of axes respectively oriented in different directions to receive the first signal and the second signal in each of the plurality of axes; a strength meter disposed on the portable device to measure a reception strength of the first signal and the second signal received by each of the plurality of axes of the receiver; a comparator configured to execute a comparative process of comparing reception strength ratios of the first signal and the second signal, based on a measurement value of the reception strength; and a determiner configured to determine the relay attack based upon a result of the comparative process in the comparator. In a case where the plurality of axes include an ineffective axis in which the measurement value of the reception strength of the first signal or the second signal deviates from a usable range, the comparator excludes the ineffective axis and executes the comparative process.

Meanwhile, PATENT LITERATURE 3 (Japanese Laid-Open Patent Publication (translation of PCT application) No. 2020-521073) discloses a Bluetooth low energy (BLE) passive vehicle access control system. That is, this BLE passive vehicle access control system includes: a vehicle; an external device communicably coupled to the vehicle; a location receiver assembly configured to determine coordinates of at least one of the vehicle and the external device; and a processor communicably coupled to the location receiver assembly, the processor disabling a communication between the vehicle and the external device when the coordinates of the vehicle do not match the coordinates of the external device.

CITATION LIST

Patent Literature

PATENT LITERATURE 1: Japanese Patent No. 6653986
PATENT LITERATURE 2: Japanese Patent No. 6653985
PATENT LITERATURE 3: Japanese Laid-Open Patent Publication (translation of PCT application) No. 2020-521073

SUMMARY OF THE INVENTION

A smart entry system according to the present disclosure includes a central device, and a peripheral device configured to transmit a radio wave to the central device. The central device includes: a communication unit configured to receive the radio wave transmitted from the peripheral device; a measurement unit configured to measure a value regarding the radio wave; and a determination unit configured to evaluate validity of the radio wave, based on a plurality of kinds of measurement results obtained by the measurement unit, and on a criterion based on distribution of the respective measurement results acquired in advance, and determine whether or not to permit entry, based on a result of the evaluation.

A central device according to the present disclosure includes: a communication unit configured to receive a radio wave; a measurement unit configured to measure a value regarding the radio wave; and a determination unit configured to evaluate validity of the radio wave, based on a plurality of kinds of measurement results obtained by the measurement unit, and on a criterion based on distribution of the respective measurement results obtained in advance, and determine whether or not to permit entry, based on a result of the evaluation.

A smart entry program according to the present disclosure is used in a central device that receives a radio wave from a peripheral device, and the program causes a computer to function as: a measurement unit configured to measure a value regarding the radio wave; and a determination unit configured to evaluate validity of the radio wave, based on a plurality of kinds of measurement results obtained by the measurement unit, and on a criterion based on distribution of the respective measurement results obtained in advance, and determine whether or not to permit entry, based on a result of the evaluation.

A smart entry method according to the present disclosure is a method used by a central device, and includes: receiving a radio wave from a peripheral device; measuring a value regarding the radio wave; and evaluating validity of the radio wave, based on a plurality of kinds of measurement results, and on a criterion based on distribution of the respective measurement results obtained in advance, and determining whether or not to permit entry, based on a result of the evaluation.

One mode of the present disclosure can be realized as a semiconductor integrated circuit that realizes a part or the entirety of a central device, or as a system including the central device. One mode of the present disclosure can be realized as a semiconductor integrated circuit that realizes a part or the entirety of a system including a central device, or as a program that causes a computer to perform the steps of the processes in the system including the central device.

BRIEF DESCRIPTION OF DRAWINGS

FIG. 6 shows an example of a parameter group stored in a storage unit in the smart entry system according to the embodiment of the present disclosure.

DETAILED DESCRIPTION

Figure 1:
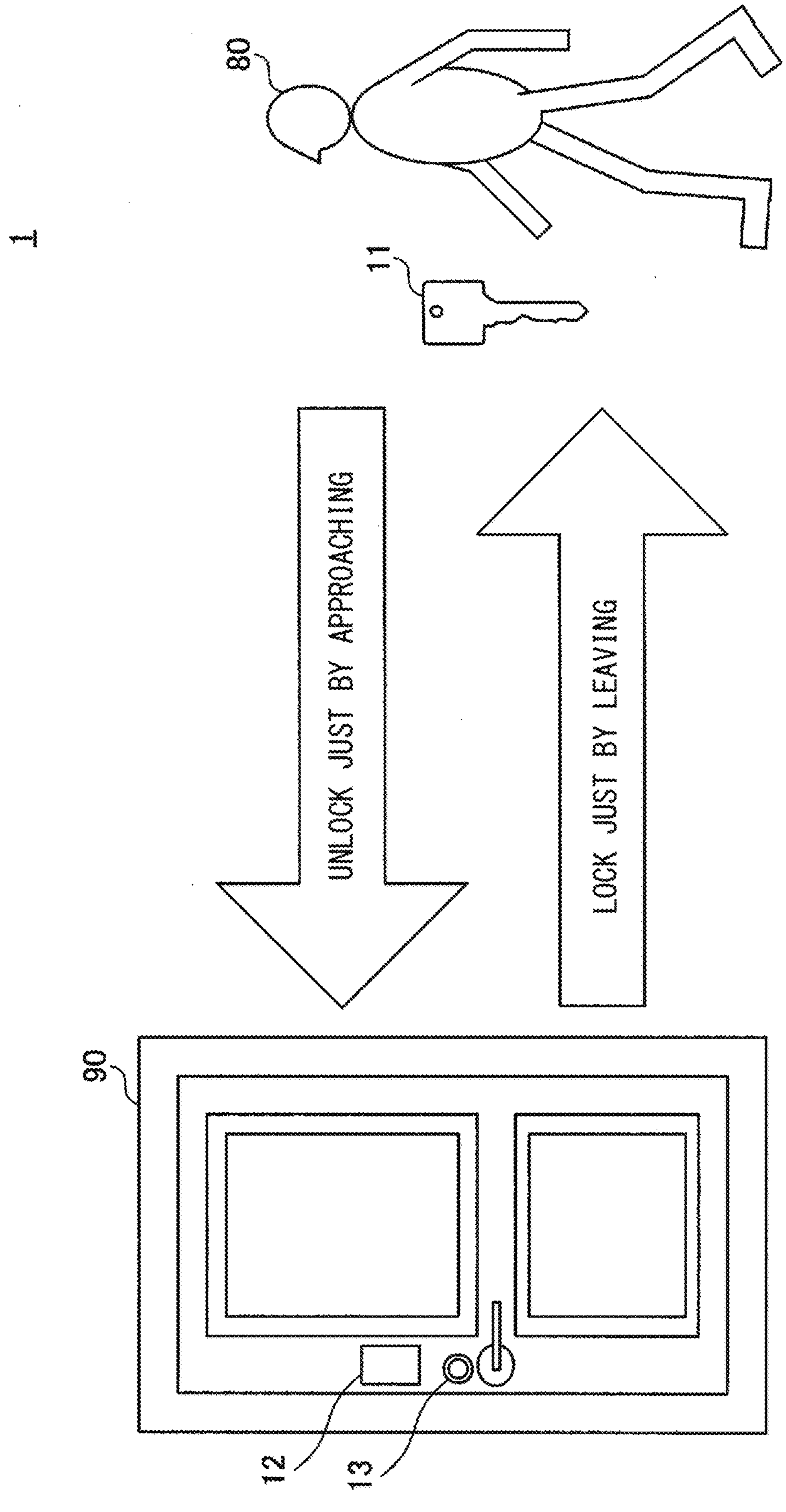
FIG. 1 shows a configuration of a smart entry system according to an embodiment of the present disclosure.

Conventionally, a technology for improving security in a smart entry system has been developed.

Problems to be Solved by the Present Disclosure

A technology capable of more accurately detecting unauthorized entry such as relay attack to the smart entry system is desired, beyond the technologies described in PATENT LITERATURES 1 to 3.

The present disclosure has been made to solve the above problems and an object of the present disclosure is to provide a smart entry system, a central device, a smart entry program, and a smart entry method capable of more accurately detecting unauthorized entry in the smart entry system.

Effects of the Present Disclosure

According to the present disclosure, unauthorized entry in the smart entry system can be more accurately detected.

Description of Embodiment of the Present Disclosure

First, the contents of embodiments of the present disclosure are listed and described.

(1) A smart entry system according to an embodiment of the present disclosure includes a central device, and a peripheral device configured to transmit a radio wave to the central device. The central device includes: a communication unit configured to receive the radio wave transmitted from the peripheral device; a measurement unit configured to measure a value regarding the radio wave; and a determination unit configured to evaluate validity of the radio wave, based on a plurality of kinds of measurement results obtained by the measurement unit, and on a criterion based on distribution of the respective measurement results acquired in advance, and determine whether or not to permit entry, based on a result of the evaluation.

In this configuration, validity of the radio wave transmitted from the peripheral device to the central device is evaluated based on the plurality of kinds of measurement results, and on the criterion based on distribution of the respective measurement results acquired in advance, and whether or not to permit entry is determined based on a result of the evaluation. Therefore, accuracy of evaluation can be enhanced, compared to the case of evaluating validity of the radio wave based on a single measurement result. Moreover, for example, even w % ben the signal strength varies due to the peripheral device being housed in a case, reduction in evaluation accuracy can be inhibited. Therefore, unauthorized entry in the smart entry system can be more accurately detected.

(2) The radio wave may include encrypted information, and the determination unit may evaluate validity of the radio wave, further based on whether or not the encrypted information can be decrypted.

In this configuration, the method for evaluating validity of the radio wave is multiplexed, whereby unauthorized entry in the smart entry system can be more accurately detected.

(3) The smart entry system may include a plurality of peripheral devices. Based on the criterion for each of the peripheral devices, the determination unit may evaluate validity of the radio wave transmitted from the corresponding peripheral device.

In this configuration, even when performance such as electric field strength, encryption speed, or the like varies among the peripheral devices, reduction in evaluation accuracy can be inhibited.

(4) The plurality of kinds of measurement results may include RTT (Round Trip Time) of the radio wave and RSSI (Received Signal Strength Indication) of the radio wave.

In this configuration, the configuration of the central device can be simplified by using a simple measurement system.

(5) The determination unit may evaluate validity of the radio wave, based on a Mahalanobis distance calculated from distribution of the plurality of kinds of measurement results obtained by the measurement unit, and on the criterion.

In this configuration, unauthorized entry can be more accurately detected by using software processing.

(6) The smart entry system may further include a lock mechanism that is controlled by the central device, and the determination unit may determine unlocking/locking of the lock mechanism, based on the result of the evaluation.

In this configuration, for example, security in a house, a vehicle, etc., can be enhanced.

(7) The lock mechanism may be an electronic lock installed on a door, and the determination unit may cause the lock mechanism to unlock or lock the door, based on the result of the evaluation.

In this configuration, for example, security of a door of a house, a vehicle, etc., can be enhanced.

(8) A central device according to an embodiment of the present disclosure includes: a communication unit configured to receive a radio wave; a measurement unit configured to measure a value regarding the radio wave; and a determination unit configured to evaluate validity of the radio wave, based on a plurality of kinds of measurement results obtained by the measurement unit, and on a criterion based on distribution of the respective measurement results obtained in advance, and determine whether or not to permit entry, based on a result of the evaluation.

In this configuration, validity of the radio wave received by the central device is evaluated based on the plurality of kinds of measurement results, and on the criterion based on distribution of the respective measurement results acquired in advance, and whether or not to permit entry is determined based on a result of the evaluation. Therefore, accuracy of evaluation can be enhanced, compared to the case of evaluating validity of the radio wave based on a single measurement result. Moreover, for example, even when the signal strength varies, reduction in evaluation accuracy can be inhibited. Therefore, unauthorized entry in the smart entry system can be more accurately detected.

(9) A smart entry program according to an embodiment of the present disclosure is used in a central device that receives a radio wave from a peripheral device, and the program causes a computer to function as: a measurement unit configured to measure a value regarding the radio wave; and a determination unit configured to evaluate validity of the radio wave, based on a plurality of kinds of measurement results obtained by the measurement unit, and on a criterion based on distribution of the respective measurement results obtained in advance, and determine whether or not to permit entry, based on a result of the evaluation.

In this configuration, validity of the radio wave transmitted from the peripheral device to the central device is evaluated based on the plurality of kinds of measurement results, and on the criterion based on distribution of the respective measurement results acquired in advance, and whether or not to permit entry is determined based on a result of the evaluation. Therefore, accuracy of evaluation can be enhanced, compared to the case of evaluating validity of the radio wave based on a single measurement result. Moreover, for example, even when the signal strength varies due to the peripheral device being housed in a case, reduction in evaluation accuracy can be inhibited. Therefore, unauthorized entry in the smart entry system can be more accurately detected.

(10) A smart entry method according to an embodiment of the present disclosure is a method used by a central device, and includes: receiving a radio wave from a peripheral device; measuring a value regarding the radio wave; and evaluating validity of the radio wave, based on a plurality of kinds of measurement results of the radio wave, and on a criterion based on distribution of the respective measurement results obtained in advance, and determining whether or not to permit entry, based on a result of the evaluation.

In this method, validity of the radio wave transmitted from the peripheral device to the central device is evaluated based on the plurality of kinds of measurement results, and on the criterion based on distribution of the respective measurement results acquired in advance, and whether or not to permit entry is determined based on a result of the evaluation. Therefore, accuracy of evaluation can be enhanced, compared to the case of evaluating validity of the radio wave based on a single measurement result. Moreover, for example, even when the signal strength varies due to the peripheral device being housed in a case, reduction in evaluation accuracy can be inhibited. Therefore, unauthorized entry in the smart entry system can be more accurately detected.

Hereinafter, embodiments of the present disclosure will be described with reference to the drawings. In the drawings, the same or corresponding parts are denoted by the same reference signs, and description thereof is not repeated. At least some parts of the embodiments described below can be combined together as desired.

[Configuration and Basic Operation]

FIG. 1 shows a configuration of a smart entry system according to an embodiment of the present disclosure.

With reference to FIG. 1, a smart entry system 1 includes a peripheral device 11, a central device 12, and a lock mechanism 13.

For example, the peripheral device 11 is an electronic key that can be carried by a user 80, and has a wireless communication function. The peripheral device 11 transmits, to the central device 12, a radio wave including an advertising signal that is adopted in Bluetooth Low Energy (Bluetooth: registered trademark) based on IEEE802.15.1, for example.

The central device 12 includes an electronic lock and is installed on a door 90 of a house, for example. The central device 12 can wirelessly communicate with the peripheral device 11. For example, the central device 12 has a scanning function, and when the peripheral device 11 has entered a communication range, receives the radio wave transmitted from the peripheral device 11. The wireless communication between the peripheral device 11 and the central device 12 may be performed in a broadcast manner or a connection-oriented manner.

Upon receiving the advertising signal from the peripheral device 11, the central device 12 performs a connection process with the peripheral device 11. In more detail, the central device 12 transmits, to the peripheral device 11, a scanning request in response to the received advertising signal. Upon receiving the scanning request, the peripheral device 11 transmits a scanning response to the central device 12. Thus, communication connection between the central device 12 and the peripheral device 11 is established. Since the connection process between the central device 12 and the peripheral device 11 is well known, detailed description thereof is omitted.

Upon establishing the communication connection with the peripheral device 11, the central device 12 evaluates whether or not the peripheral device 11 is a valid device. Upon determining that the peripheral device 11 is valid, the central device 12 permits entry of the peripheral device 11. Upon determining that the peripheral device 11 is not valid, the central device 12 refuses entry of the peripheral device 11. Specifically, the central device 12 determines unlocking/locking of the lock mechanism 13, based on the evaluation result, thereby permitting or refusing entry of the peripheral device 11.

The lock mechanism 13 is an electronic lock installed on the door 90 and is controlled by the central device 12, for example. In more detail, the central device 12 controls the lock mechanism 13 to unlock or lock the door 90, based on the evaluation result. Specifically, the lock mechanism 13 unlocks or locks the door 90 when the central device 12 permits entry of the peripheral device 11, and maintains the locked state or the unlocked state of the door 90 when the central device 12 refuses entry of the peripheral device 11.

Figure 2:
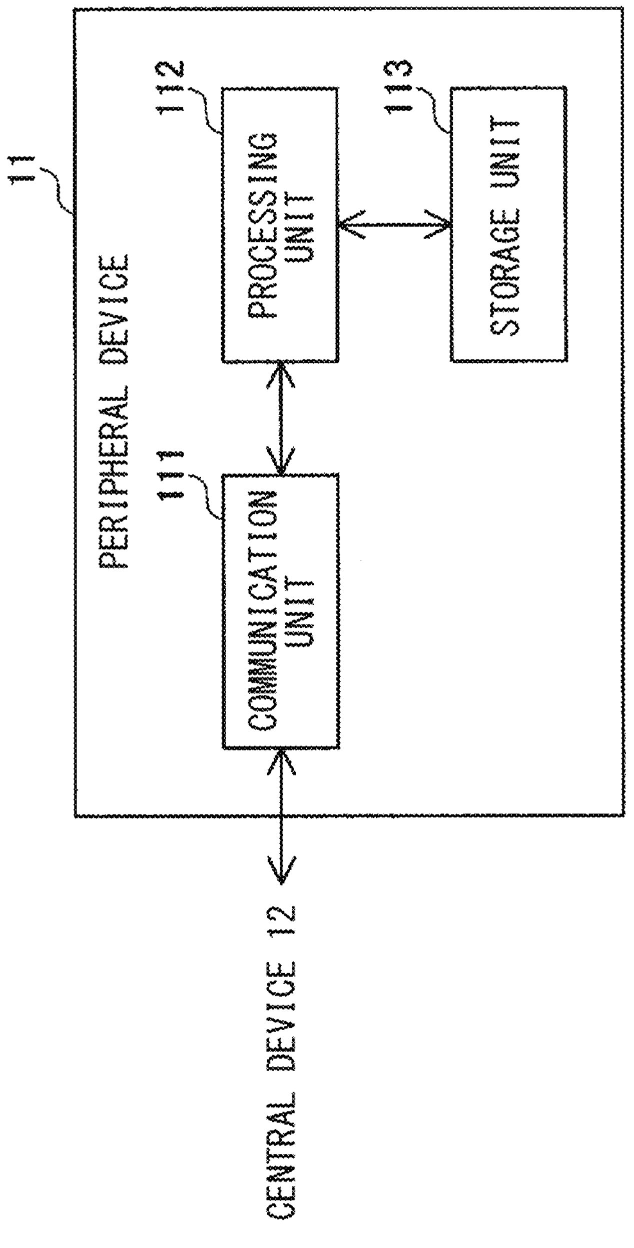
FIG. 2 shows a configuration of a peripheral device in the smart entry system according to the embodiment of the present disclosure.

FIG. 2 shows a configuration of a peripheral device in the smart entry system according to the embodiment of the present disclosure.

With reference to FIG. 2, the peripheral device 11 includes a communication unit 111, a processing unit 112, and a storage unit 113.

For example, the communication unit 111 receives a radio wave in an LF (Low Frequency) band from the central device 12, and transmits a radio wave in an RF (Radio Frequency) band to the central device 12. The communication unit 111 is implemented by a communication circuit such as a communication IC (Integrated Circuit), for example.

The processing unit 112 performs a data encryption process, a data decryption process, and the like. For example, the processing unit 112 performs encryption of data to be transmitted to the central device 12, and performs decryption of encrypted data received from the central device 12. The processing unit 112 is implemented by a processor such as a CPU (Central Processor Unit) or a DSP (Digital Signal Processing), for example. The storage unit 113 is a nonvolatile memory, for example.

Figure 3:
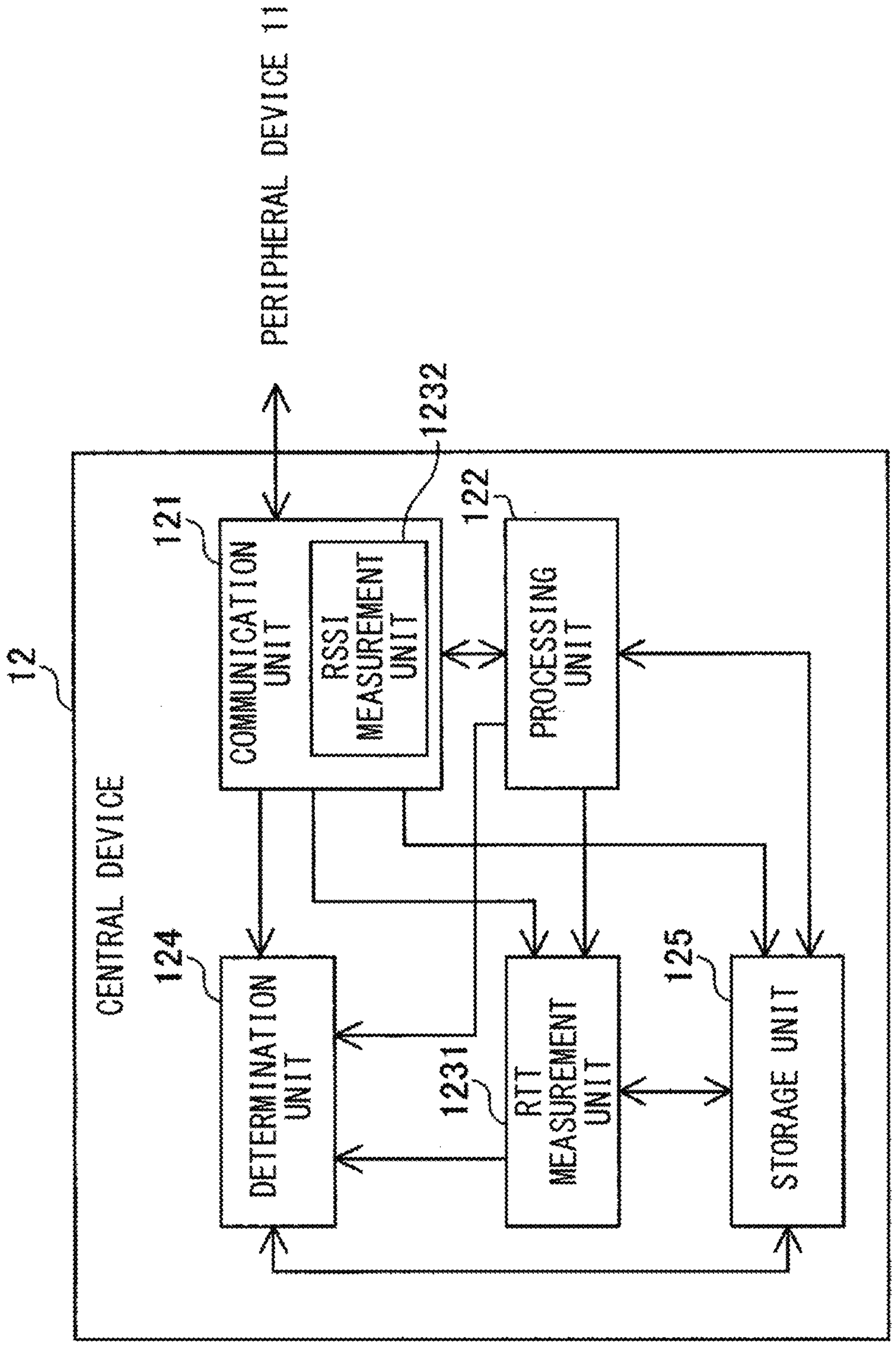
FIG. 3 shows a configuration of a central device in the smart entry system according to the embodiment of the present disclosure.

FIG. 3 shows a configuration of a central device in the smart entry system according to the embodiment of the present disclosure.

With reference to FIG. 3, the central device 12 includes a communication unit 121, a processing unit 122, an RTT measurement unit 1231, a determination unit 124, and a storage unit 125. The communication unit 121 includes an RSSI measurement unit 1232. The communication unit 121 is implemented by a communication circuit such as a communication IC, for example. The processing unit 122, the RTT measurement unit 1231, and the determination unit 124 are each implemented by a processor such as a CPU or a DSP, for example. The storage unit 125 is a nonvolatile memory, for example.

The communication unit 121 wirelessly communicates with the communication unit 111 in the peripheral device 11. For example, the communication unit 121 receives a radio wave in an RF band transmitted from the peripheral device 11, and transmits a radio wave in an LF band to the peripheral device 11.

The processing unit 122 performs a data encryption process, a data decryption process, and the like. For example, the processing unit 122 performs encryption of data to be transmitted to the peripheral device 11, and performs decryption of encrypted data received from the peripheral device 11.

The RTT measurement unit 1231 and the RSSI measurement unit 1232, each being an example of a measurement unit, measure values regarding the radio wave transmitted from the peripheral device 11. In more detail, the RTT measurement unit 1231 measures RTT (Round Trip Time) in wireless communication between the central device 12 and the peripheral device 11. The RSSI measurement unit 1232 measures RSSI (Received Signal Strength Indicator) of the radio wave transmitted from the peripheral device 11.

The determination unit 124 evaluates validity of the peripheral device 11, and determines whether or not to permit entry of the peripheral device 11.

[Operation Flow]

Each of the devices in the smart entry system according to the embodiment of the present disclosure includes a computer including a memory. An arithmetic processing unit such as a CPU in the computer reads out, from the memory, a program including a part or all of steps in the sequences shown below, and executes the program. Programs of the plurality of devices can each be installed from outside. The programs of the plurality of devices are each distributed through a communication circuit, or in a state of being stored in a storage medium.

Figure 4:
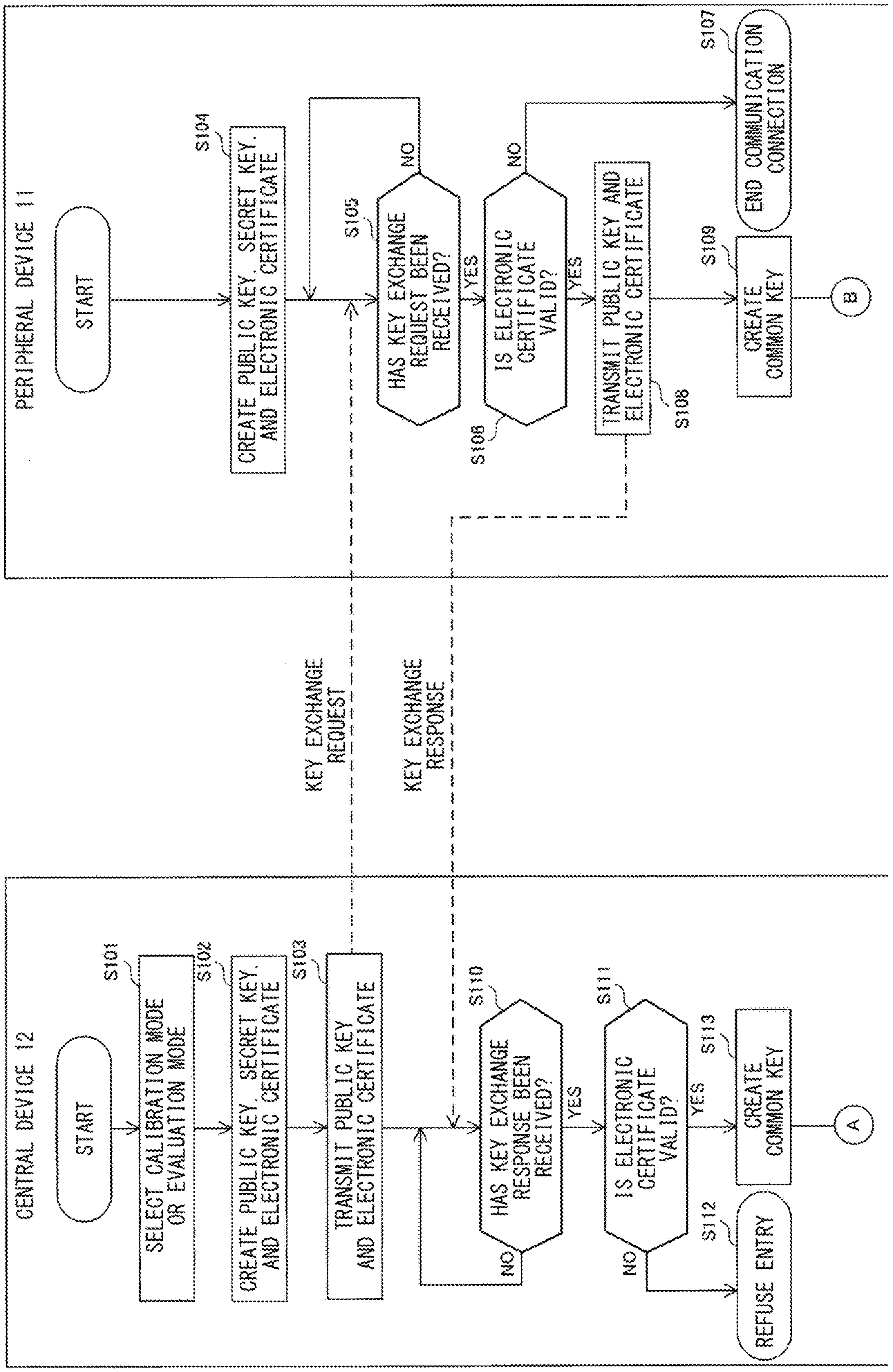
FIG. 4 shows an example of an operation procedure when entry is permitted in the smart entry system according to the embodiment of the present disclosure.
Figure 5:
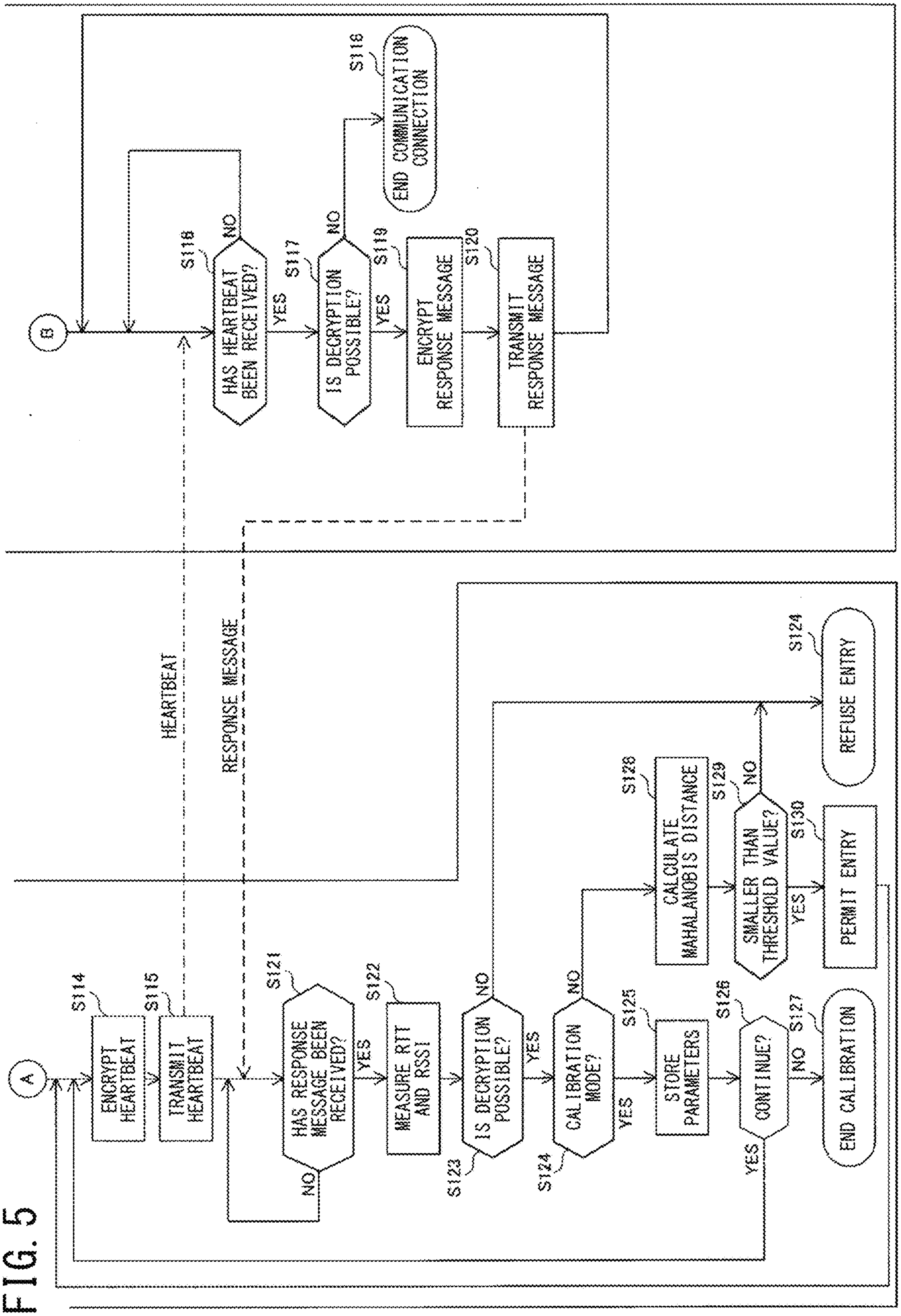
FIG. 5 shows an example of an operation procedure when entry is permitted in the smart entry system according to the embodiment of the present disclosure.

FIG. 4 and FIG. 5 show an example of an operation procedure when entry is permitted in the smart entry system according to the embodiment of the present disclosure. FIG. 4 shows a first half of the operation procedure, and FIG. 5 shows a second half of the operation procedure. FIG. 4 and FIG. 5 show the operation procedure after a connection process for the peripheral device 11 and the central device 12 has been completed.

With reference to FIG. 4, first, the user 80 selects a calibration mode or an evaluation mode at the central device 12, when the connection process for the central device 12 and the peripheral device 11 has been completed. In the calibration mode, a calibration process of calibrating various parameters that are used for evaluation of validity of the radio wave from the peripheral device 11, is performed. In the evaluation mode, validity of the radio wave is evaluated, and whether or not to permit entry is determined based on the evaluation result. The user 80 selects either mode by operating a switch or the like disposed on the central device 12, for example (step S101).

Next, in the central device 12, the processing unit 122 creates an encryption key. In more detail, the processing unit 122 creates a pair of a public key and a secret key, for example. In addition, the processing unit 122 creates an electronic certificate for the created public key (step S102).

Next, the processing unit 122 transmits the created public key and electronic certificate, together with a key exchange request, to the peripheral device 11 via the communication unit 121 (step S103).

In the peripheral device 11, the processing unit 112 creates an encryption key, when the connection process for the central device 12 and the peripheral device 11 has been completed. In more detail, the processing unit 112 creates a pair of a public key and a secret key, for example. In addition, the processing unit 112 creates an electronic certificate for the created public key (step S104).

Next, the processing unit 112 confirms whether or not the key exchange request has been received from the central device 12 via the communication unit 111. In more detail, when the key exchange request has not been received (NO in step S105), the processing unit 112 waits for the key exchange request from the central device 12. Meanwhile, upon receiving the public key, the electronic certificate, and the key exchange request from the central device 12 via the communication unit 111 (YES in step S105), the processing unit 112 verifies the electronic certificate.

Next, upon confirming that the received public key is not one created in the central device 12 (NO in step S106), the processing unit 112 ends the communication connection with the central device 12 (step S107). Meanwhile, upon confirming that the received public key is one created in the central device 12 (YES in step S106), the processing unit 112 transmits the created public key and electronic certificate, together with a key exchange response, to the central device 12 via the communication unit 111 (step S108), and creates a common key by using the created secret key and the received public key (step S109).

In the central device 12, the processing unit 122 confirms whether or not the key exchange response has been received from the peripheral device 11 via the communication unit 121. In more detail, the processing unit 122 waits for the key exchange response (NO in step S110). Upon receiving the public key, the electronic certificate, and the key exchange response from the peripheral device 11 via the communication unit 121 (YES in step S110), the processing unit 122 verifies the electronic certificate.

Next, upon confirming that the received public key is not one created in the peripheral device 11 (NO in step S111), the processing unit 122 refuses entry of the peripheral device 11 (step S112). Meanwhile, upon confirming that the received public key is one created in the peripheral device 11 (YES in step S11), the processing unit 122 creates a common key by using the created secret key and the received public key (step S113).

With reference to FIG. 5, next, the processing unit 122 encrypts data by using the created common key. The data is, for example, a signal (hereinafter referred to as "heartbeat") that is periodically transmitted to confirm that the peripheral device 11 is in an active state (step S114).

Next, the processing unit 122 periodically transmits the encrypted heartbeat to the peripheral device 11 via the communication unit 121, and stores the transmission time of the heartbeat in the storage unit 125 (step S115).

Next, in the peripheral device 11, the processing unit 112 confirms whether or not the heartbeat has been received from the central device 12 via the communication unit 111. In more detail, the processing unit 112 waits for the heartbeat (NO in step S116). Upon receiving the heartbeat from the central device 12 via the communication unit 111 (YES in step S116), the processing unit 112 performs a decryption process for the heartbeat.

Next, when the heartbeat cannot be decrypted (NO in step S117), the processing unit 112 ends the communication connection with the central device 12 (step S118). Meanwhile, when the heartbeat has been decrypted (YES in step S117), the processing unit 112 encrypts a response message by using the created common key (step S119), and transmits a radio wave including the response message as encrypted information, to the central device 12 via the communication unit 111 (step S120).

Next, in the central device 12, the communication unit 121 confirms whether or not the response message has been received from the peripheral device 11. In more detail, when the response message has not been received (NO in step S121), the communication unit 121 waits for the response message from the peripheral device 11. Meanwhile, upon receiving the response message from the peripheral device 11 (YES in step S121), the RSSI measurement unit 1232 in the communication unit 121 measures RSSI indicating the reception strength of the radio wave including the response message, and outputs the RSSI to the determination unit 124. In addition, the communication unit 121 outputs, to the RTT measurement unit 1231, a reception notification indicating that the response message was received.

Next, upon receiving the reception notification from the communication unit 121, the RTT measurement unit 1231 calculates RTT from a difference between the heartbeat transmission time and the response message reception time, and outputs the RTT to the determination unit 124 (step S122).

Upon receiving the response message from the peripheral device 11 via the communication unit 121, the processing unit 122 performs a decryption process for the response message by using the created common key. When the response message cannot be decrypted (NO in step S123), the processing unit 122 refuses entry of the peripheral device 11 (step S124). Meanwhile, when the response message has been decrypted (YES in step S123), the processing unit 122 outputs, to the determination unit 124, a decryption completion notification indicating that the decryption was completed. The order of the process in step S122 and the process in step S123 may be changed, or these steps may be performed in parallel.

Next, upon receiving the RTT and the RSSI from the RTT measurement unit 1231 and the RSSI measurement unit 1232, and the decryption completion notification from the processing unit 122, the determination unit 124 determines whether or not the central device 12 is in the calibration mode or in the evaluation mode. When the central device 12 is in the calibration mode (YES in step S124), the determination unit 124 performs a calibration process of calibrating various parameters that are used for evaluation of validity of the radio wave from the peripheral device 11.

In more detail, the determination unit 124 repeats transmission of heartbeats to the peripheral device 11 and reception of response messages from the peripheral device 11 for a predetermined period, thereby acquiring a plurality of RTTs and a plurality of RSSIs. The determination unit 124 calculates a standard deviation of the plurality of RTTs acquired, a standard deviation of the plurality of RSSIs acquired, and a covariance of each pair of RT and RSSI.

Specifically, SD-RTT, which is the standard deviation of the RTTs, is expressed by the following formula (1).

[Math. 1]

$$SD_{RTT} = \sqrt{\frac{1}{n}\sum_{i=1}^{n}(RTTi - RTTave)^2} \tag{1}$$

where RTTi represents an actually measured RTT value, RTTave represents an average value of the plurality of RTTs, and n represents the total number of data.

SD-RSSI, which is the standard deviation of the RSSIs, is expressed by the following formula (2).

[Math. 2]

$$SD_{RSSI} = \sqrt{\frac{1}{n}\sum_{i=1}^{n}(RSSIi - RSSIave)^2} \tag{2}$$

where RSSIi represents an actually measured RSSI value, RSSlave represents an average value of the plurality of RSSIs, and n represents the total number of data.

COV, which is the covariance of each pair of RTT and RSSI, is expressed by the following formula (3).

[Math. 3]

$$\mathrm{COV} = \frac{1}{n}\sum_{i=1}^{n}(RTTi - RTTave)(RSSIi - RSSIave) \tag{3}$$

where n represents the total number of data.

The determination unit 124 calculates three parameters expressed by the following formulae (4) to (6), based on the standard deviation of the RTTs, the standard deviation of the RSSIs, and the covariance which have been calculated.

[Math. 4]

$$\sigma_{RSSI}^{RTT} = \frac{SD_{RSSI}}{SD_{RTT} \times SD_{RSSI} - \mathrm{COV}^2} \tag{4}$$

[Math. 5]

$$\sigma_{RSSI,RTT} = -\frac{\mathrm{COV}}{SD_{RTT} \times SD_{RSSI} - \mathrm{COV}^2} \tag{5}$$

[Math. 6]

$$\sigma_{RTT}^{RTT} = \frac{SD_{RTT}}{SD_{RTT} \times SD_{RSSI} - \mathrm{COV}^2} \tag{6}$$

The determination unit 124 sets the three calculated parameters to reference values, and stores, in the storage unit 125, the parameters as a parameter group matrix expressed by the following formula (7) (step S125). Then, the determination unit 124 determines whether or not to continue the calibration mode. For example, when the peripheral device 11 is moved to a new place and the calibration mode is continued (YES in step S126), the determination unit 124 repeats the processes in steps S114 to S125. When the calibration mode is not continued (NO in step S126), the determination unit 124 ends the calibration process (step S127).

[Math. 7]

$$\Sigma = \begin{pmatrix} \sigma_{RSSI}^{RTT} & \sigma_{RSSI,RTT} \\ \sigma_{RSSI,RTT} & \sigma_{RTT}^{RTT} \end{pmatrix} \tag{7}$$

FIG. 6 shows an example of parameter groups stored in the storage unit in the smart entry system according to the embodiment of the present disclosure.

With reference to FIG. 6, when the smart entry system 1 includes a plurality of peripheral devices 11, the determination unit 124 calculates the aforementioned parameter group matrix for each of the peripheral devices 11, and stores, in the storage unit 125, each parameter group matrix in association with the ID of the corresponding peripheral device 11.

Referring back to FIG. 5, when the evaluation mode is selected in step S101 (NO in step S124), the determination unit 124 evaluates validity of the radio wave, based on the plurality of kinds of measurement results obtained by the measurement units, and on a criterion based on distribution of the respective measurement results acquired in advance, and determines whether or not to permit entry, based on the evaluation result.

In more detail, the determination unit 124 evaluates validity of the radio wave, based on a Mahalanobis distance calculated based on distribution of RTTs and RSSIs which are the plurality of kinds of measurement results obtained by the measurement unit, and on the criterion. Specifically, the determination unit 124 receives the RTTs and the RSSIs from the RTT measurement unit 1231 and the RSSI measurement unit 1232, respectively, obtains, from the storage unit 125, the parameters in formula (7) expressing the reference values, and calculates a Mahalanobis distance from the RTTs and the RSSIs as the measurement results, according to a formula expressed on the left side of the following formula (8) (step S128).

[Math. 8]

$$(RTT \times \sigma_{RSSI}^{RTT} + RSSI \times \sigma_{RSSI,RTT}) \times RTT + (RTT \times \sigma_{RSSI,RTT} + RSSI \times \sigma_{RTT}^{RTT}) \times RSSI < thr \tag{8}$$

where RTT and RSSI represent actually measured values.

Next, the determination unit 124 acquires, from the storage unit 125, a threshold value thr which is a criterion, for the calculated Mahalanobis distance, determined based on the parameters calculated in the previous calibration mode and represented by formula (7). When the smart entry system 1 includes a plurality of peripheral devices 11, the determination unit 124 acquires, from the storage unit 125, the threshold value thr for each of the peripheral devices 11. The threshold value thr has been stored in the storage unit 125 in advance.

Next, the determination unit 124 determines whether or not the calculated Mahalanobis distance is smaller than the threshold value thr. When the Mahalanobis distance is greater than the threshold value thr (NO in step S129), the determination unit 124 determines that the radio wave from the peripheral device 11 is not valid, and refuses entry of the peripheral device 11 (step S124). Meanwhile, when the Mahalanobis distance is smaller than the threshold value thr (YES in step S129), the determination unit 124 determines that the radio wave from the peripheral device 11 is valid, and permits entry of the peripheral device 11 (step S130). The processes in steps S114 to S130 are, for example, periodically repeated while the communication connection between the peripheral device 11 and the central device 12 is established.

When the user 80 carrying the peripheral device 11 is a predetermined distance or more away from the central device 12, the peripheral device 11 becomes incapable of decrypting heartbeats from the central device 12 (NO in step S117), and ends the communication connection with the central device 12 (step S118). At this time, if the door 90 is in the unlocked state, the door 90 is locked. Furthermore, the central device 12 becomes incapable of decrypting response messages from the peripheral device 11 (NO in step S123), and refuses entry of the peripheral device 11 (step S124). At this time, if the door 90 is in the unlocked state, the door 90 is locked.

Meanwhile, a technology capable of accurately detecting unauthorized entry such as relay attack to a smart entry system has been desired.

Examples of conceivable methods include: a method of determining unauthorized entry by using a physical quantity of either RTT or RSSI of a radio wave transmitted from a peripheral device to a central device; and a method of determining unauthorized entry by using a motion sensor that specifies coordinates of at least one of a peripheral device and a central device.

However, in the method using the physical quantity of either RTT or RSSI of a radio wave, if the RTT or the RSSI is disguised, unauthorized entry such as relay attack cannot be accurately detected in some cases. In the method using a motion sensor, production cost and power consumption of the peripheral device or the central device are increased.

In contrast to the above methods, in the smart entry system 1 according to the embodiment of the present disclosure, validity of a radio wave transmitted from the peripheral device 11 to the central device 12 is evaluated based on a Mahalanobis distance calculated from measurement results of RTTs and RSSIs, and on a criterion, for the Mahalanobis distance, acquired in advance, and whether or not to permit entry is determined based on the evaluation result. In this configuration, the distance between the central device 12 and the peripheral device 11 and the relationship between the distance and the radio wave strength can be appropriately derived. Thus, accuracy of evaluation can be enhanced, compared to the case of evaluating validity of the radio wave based on the measurement result of one of RTT and RSSI, whereby false positive determination or false negative determination in relay attack detection can be reduced, for example. By using the Mahalanobis distance, reduction in evaluation accuracy can be inhibited even when the signal strength varies due to the peripheral device 11 being housed in a case, for example, and moreover, unauthorized entry can be more accurately detected by using software processing without adding a special device with high processing capability. Therefore, unauthorized entry in the smart entry system can be more accurately detected.

In the smart entry system 1 according to the embodiment of the present disclosure, in addition to evaluation of validity of a radio wave by using a Mahalanobis distance, validity of the radio wave is also evaluated based on whether or not an encrypted heartbeat and a response message can be decrypted. In this configuration, even if RTT and RSSI of a radio wave are disguised and such an unauthorized radio wave is determined as an authorized one in evaluation using a Mahalanobis distance, entry is not permitted unless an encrypted heartbeat and a response message are decrypted. Therefore, security in the smart entry system 1 can be further enhanced.

[Modification 1]

In the above embodiment, the smart entry system 1 includes one peripheral device 11. However, the smart entry system 1 may include a plurality of peripheral devices 11. In this case, the determination unit 124 in the central device 12 acquires in advance a criterion for each of the peripheral devices 11, and evaluates validity of a radio wave for each peripheral device 11 by using the corresponding criterion.

[Modification 2]

In the above embodiment, as a plurality of kinds of measurement results regarding a radio wave, measurement results of RTT and RSSI are adopted. However, the central device 12 may measure physical quantities other than RTT and RSSI.

[Modification 3]

In the above embodiment, a Mahalanobis distance is calculated from measured RTT and RSSI. However, the central device 12 may calculate a reliable section of a standard deviation from a plurality of kinds of measurement results to evaluate validity of a radio wave. Alternatively, the central device 12 may input a plurality of kinds of measurement results into a learning model of machine learning to evaluate validity of a radio wave.

[Modification 4]

In the above embodiment, the smart entry system 1 includes the lock mechanism 13. However, the smart entry system 1 may not necessarily include the lock mechanism 13. For example, the central device 12 may determine whether or not to permit entry into a predetermined area in a certain space.

[Modification 5]

In the above embodiment, the smart entry system 1 is applied to an entrance of a facility such as a house. However, the smart entry system 1 may be applied to a smart key system of a vehicle, for example. That is, the central device 12 may be an in-vehicle device installed in a vehicle, and the peripheral device 11 may be a smart key that unlocks or locks doors of the vehicle. Alternatively, the smart entry system 1 may be applied to an entry system through which an operator whose both hands are full is assumed to enter and exit, such as an entry/exit system for a treatment room of a hospital, and an entry/exit system for each of workrooms in a factory.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

A smart entry system comprising:

a central device, and a peripheral device configured to transmit a radio wave to the central device, wherein the central device includes a communication unit configured to receive the radio wave transmitted from the peripheral device, a measurement unit configured to measure a value regarding the radio wave, and a determination unit configured to evaluate validity of the radio wave, based on a plurality of kinds of measurement results obtained by the measurement unit, and on a criterion based on distribution of the respective measurement results obtained in advance, and determine whether or not to permit entry, based on a result of the evaluation, the central device is an in-vehicle device installed in a vehicle, and the peripheral device is a smart key that unlocks or locks doors of the vehicle.

[Additional Note 2]

A central device comprising:

a communication unit configured to receive a radio wave;

a measurement unit configured to measure a value regarding the radio wave; and a determination unit configured to evaluate validity of the radio wave, based on a plurality of kinds of measurement results obtained by the measurement unit, and on a criterion based on distribution of the respective measurement results obtained in advance, and determine whether or not to permit entry, based on a result of the evaluation, the central device being an in-vehicle device installed in a vehicle.

REFERENCE SIGNS LIST

1 smart entry system
11 peripheral device
111 communication unit
112 processing unit
113 storage unit
12 central device
121 communication unit
122 processing unit
1231 RTT measurement unit
1232 RSSI measurement unit
124 determination unit
125 storage unit
13 lock mechanism
80 user
90 door

The invention claimed is:

1. A smart entry system comprising:

a central device including processing circuitry configured to:

encrypt heartbeat data, and transmit the encrypted heartbeat data; and a peripheral device including processing circuitry configured to:

receive the encrypted heartbeat data, when the encrypted heartbeat data cannot be decrypted, end a communication connection, and when the encrypted heartbeat data can be decrypted, decrypt the encrypted heartbeat data, encrypt a response message, and transmit a radio wave including the encrypted response message to the central device, wherein the processing circuitry of the central device is further configured to:

receive the radio wave including the encrypted response message transmitted from the peripheral device, measure a value regarding the radio wave including the encrypted response message, when the encrypted response message cannot be decrypted, refuse entry, and when the encrypted response message can be decrypted:

evaluate validity of the radio wave based on (i) a plurality of different kinds of measurement result of the radio wave transmitted from the peripheral device, (ii) a plurality of statistical distribution parameters derived based on a plurality of different kinds of the measurement result for each of a plurality of peripheral devices, and (iii) a plurality of different criterion, each of the plurality of different criterion being derived based on a distribution of the plurality of different kinds of measurement result for a respective one of each of the plurality of peripheral devices acquired in advance of receiving the radio wave including the encrypted response message transmitted from the peripheral device, and each of the plurality of different criterion being specific to different peripheral devices of the plurality of peripheral devices, and determine whether or not to permit entry based on a result of the evaluation, the plurality of statistical distribution parameters derived based on the plurality of different kinds of the measurement result for each of the plurality of peripheral devices includes a standard deviation of RTT (Round Trip Time) for each of the plurality of peripheral devices, a standard deviation of RSSI (Received Signal Strength Indication) for each of the plurality of peripheral devices, and a covariance of RTT and RSSI for each of the plurality of peripheral devices, and the processing circuitry of the central device is further configured to:

calculate the standard deviation of RTT, the standard deviation of RSSI, and the covariance of RTT and RSSI based on a plurality of RTTs and a plurality of RSSIs acquired by repeating transmission of the encrypted heartbeat data and reception of the encrypted response message for a predetermined period in a calibration mode for each of the plurality of peripheral devices, determine whether or not to continue the calibration mode based upon movement of one of the plurality of peripheral devices, and when the calibration mode is continued, repeat the calculation of the standard deviation of RTT of the one of the plurality of peripheral devices, the standard deviation of RSSI of the one of the plurality of peripheral devices, and the covariance of RTT and RSSI of the one of the plurality of peripheral devices, and update the plurality of statistical distribution parameters.

2. The smart entry system according to claim 1, further comprising the plurality of peripheral devices, wherein the processing circuitry of the central device is configured to evaluate validity of a radio wave transmitted from a specific one of the plurality of peripheral devices based on the respective one of the plurality of different criterion for each of the peripheral devices.

3. The smart entry system according to claim 1, wherein the processing circuitry of the central device is configured to evaluate the validity of the radio wave based on a Mahalanobis distance calculated from a distribution of the plurality of different kinds of measurement result of the radio wave transmitted from the peripheral device and on the plurality of different criterion.

4. The smart entry system according to claim 1, further comprising a lock mechanism that is controlled by the central device, wherein the processing circuitry of the central device is configured to perform unlocking/locking of the lock mechanism based on the result of the evaluation.

5. The smart entry system according to claim 4, wherein the lock mechanism is an electronic lock installed on a door, and the processing circuitry of the central device is configured to cause the lock mechanism to unlock or lock the door based on the result of the evaluation.

6. The smart entry system according to claim 1, wherein each of the plurality of different criterion is acquired in advance during a calibration mode for the respective one of the plurality of peripheral devices.

7. The smart entry system according to claim 1, wherein the validity is a determination that the radio wave is not relayed.

8. The smart entry system according to claim 1, wherein the plurality of different kinds of measurement result includes an RTT (Round Trip Time) which is a difference between a time of transmission of the encrypted heartbeat data and a time of reception of the encrypted response message and includes an encryption time of the encrypted response message, and when the encrypted response message can be decrypted, the processing circuitry of the central device evaluates validity of the radio wave based on:

at least the RTT for the peripheral device, and the plurality of different criterion that are each based upon a predetermined RTT specific to different peripheral devices of the plurality of peripheral devices acquired in advance of receiving the radio wave including the encrypted response message transmitted from the peripheral device, the predetermined RTTs each being a difference between a time of transmission of an encrypted heartbeat data and a time of reception of an encrypted response message for the respective one of the plurality of peripheral devices and including an encryption time of the encrypted response message for the respective one of the plurality of peripheral devices.

9. The smart entry system according to claim 1, wherein each of the plurality of statistical distribution parameters derived based on the plurality of different kinds of the measurement result for each of the plurality of peripheral devices, used in evaluating the validity of the radio wave based on the plurality of different kinds of measurement result of the radio wave transmitted from the peripheral device, is acquired in advance of receiving the radio wave including the encrypted response message transmitted from the peripheral device.

10. The smart entry system according to claim 1, wherein the plurality of statistical distribution parameters are stored as a parameter group matrix associated with an identifier of the respective one of each of the plurality of peripheral devices.

11. The smart entry system according to claim 10, wherein the processing circuitry of the central device is configured to calculate a Mahalanobis distance by applying the parameter group matrix to the measured value regarding the radio wave including the encrypted response message.

12. The smart entry system according to claim 1, wherein the processing circuitry of the central device is configured to generate a public key, a secret key, and an electronic certificate for the public key, and transmit the public key and the electronic certificate together with a key exchange request to the peripheral device to establish a common key used for encrypting the heartbeat data.

13. A central device comprising:

processing circuitry configured to:

encrypt heartbeat data, transmit the encrypted heartbeat data, receive a radio wave including an encrypted response message from a peripheral device, the encrypted message having been transmitted from the peripheral device after the peripheral device received the encrypted heartbeat data, decrypted the encrypted heartbeat data, encrypted the response message, and transmitted the radio wave including the encrypted response message to the central device, measure a value regarding the radio wave including the encrypted response message, when the encrypted response message cannot be decrypted, refuse entry, and when the encrypted response message can be decrypted:

evaluate validity of the radio wave based on (i) a plurality of different kinds of measurement result of the radio wave transmitted from the peripheral device, (ii) a plurality of statistical distribution parameters derived based on a plurality of different kinds of the measurement result for each of a plurality of peripheral devices, and (iii) a plurality of different criterion, each of the plurality of different criterion being derived based on a distribution of the plurality of different kinds of measurement result for a respective one of each of the plurality of peripheral devices acquired in advance of receiving the radio wave including the encrypted response message transmitted from the peripheral device, and each of the plurality of different criterion being specific to different peripheral devices of the plurality of peripheral devices, and determine whether or not to permit entry based on a result of the evaluation, wherein the plurality of statistical distribution parameters derived based on the plurality of different kinds of the measurement result for each of the plurality of peripheral devices includes a standard deviation of RTT (Round Trip Time) for each of the plurality of peripheral devices, a standard deviation of RSSI (Received Signal Strength Indication) for each of the plurality of peripheral devices, and a covariance of RTT and RSSI for each of the plurality of peripheral devices, and the processing circuitry is further configured to:

calculate the standard deviation of RTT, the standard deviation of RSSI, and the covariance of RTT and RSSI based on a plurality of RTTs and a plurality of RSSIs acquired by repeating transmission of the encrypted heartbeat data and reception of the encrypted response message for a predetermined period in a calibration mode for each of the plurality of peripheral devices, determine whether or not to continue the calibration mode based upon movement of one of the plurality of peripheral devices, and when the calibration mode is continued, repeat the calculation of the standard deviation of RTT of the one of the plurality of peripheral devices, the standard deviation of RSSI of the one of the plurality of peripheral devices, and the covariance of RTT and RSSI of the one of the plurality of peripheral devices, and update the plurality of statistical distribution parameters.

14. A non-transitory computer-readable storage medium having, stored therein, a smart entry program used in a central device that receives a radio wave from a peripheral device, the program causing a computer to perform a method, the method comprising:

encrypting heartbeat data;

transmitting the encrypted heartbeat data;

receiving the radio wave including an encrypted response message from the peripheral device, the encrypted message having been transmitted from the peripheral device after the peripheral device received the encrypted heartbeat data, decrypted the encrypted heartbeat data, encrypted the response message, and transmitted the radio wave including the encrypted response message to the central device;

measuring a value regarding the radio wave including the encrypted response message;

when the encrypted response message cannot be decrypted, refusing entry; and when the encrypted response message can be decrypted:

evaluating validity of the radio wave based on (i) a plurality of different kinds of measurement result of the radio wave transmitted from the peripheral device, (ii) a plurality of statistical distribution parameters derived based on a plurality of different kinds of the measurement result for each of a plurality of peripheral devices, and (iii) a plurality of different criterion, each of the plurality of different criterion being derived based on a distribution of the plurality of different kinds of measurement result for a respective one of each of the plurality of peripheral devices acquired in advance of receiving the radio wave including the encrypted response message transmitted from the peripheral device, and each of the plurality of different criterion being specific to different peripheral devices of the plurality of peripheral devices, and determining whether or not to permit entry based on a result of the evaluation, wherein the plurality of statistical distribution parameters derived based on the plurality of different kinds of the measurement result for each of the plurality of peripheral devices includes a standard deviation of RTT (Round Trip Time) for each of the plurality of peripheral devices, a standard deviation of RSSI (Received Signal Strength Indication) for each of the plurality of peripheral devices, and a covariance of RTT and RSSI for each of the plurality of peripheral devices, and the method further comprises:

calculating the standard deviation of RTT, the standard deviation of RSSI, and the covariance of RTT and RSSI based on a plurality of RTTs and a plurality of RSSIs acquired by repeating transmission of the encrypted heartbeat data and reception of the encrypted response message for a predetermined period in a calibration mode for each of the plurality of peripheral devices, determining whether or not to continue the calibration mode based upon movement of one of the plurality of peripheral devices, and when the calibration mode is continued, repeating the calculation of the standard deviation of RTT of the one of the plurality of peripheral devices, the standard deviation of RSSI of the one of the plurality of peripheral devices, and the covariance of RTT and RSSI of the one of the plurality of peripheral devices, and updating the plurality of statistical distribution parameters.

15. A smart entry method in a central device, the method comprising:

encrypting heartbeat data;

transmitting the encrypted heartbeat data;

receiving a radio wave including an encrypted response message from a peripheral device, the encrypted message having been transmitted from the peripheral device after the peripheral device received the encrypted heartbeat data, decrypted the encrypted heartbeat data, encrypted the response message, and transmitted the radio wave including the encrypted response message to the central device;

measuring a value regarding the radio wave including the encrypted response message;

when the encrypted response message cannot be decrypted, refusing entry; and when the encrypted response message can be decrypted:

evaluating validity of the radio wave based on (i) a plurality of different kinds of measurement result of the radio wave transmitted from the peripheral device, (ii) a plurality of statistical distribution parameters derived based on a plurality of different kinds of the measurement result for each of a plurality of peripheral devices, and (iii) a plurality of different criterion, each of the plurality of different criterion being derived based on a distribution of the plurality of different kinds of measurement result for a respective one of each of the plurality of peripheral devices acquired in advance of receiving the radio wave including the encrypted response message transmitted from the peripheral device, and each of the plurality of different criterion being specific to different peripheral devices of the plurality of peripheral devices, and determining whether or not to permit entry based on a result of the evaluation, wherein the plurality of statistical distribution parameters derived based on the plurality of different kinds of the measurement result for each of the plurality of peripheral devices includes a standard deviation of RTT (Round Trip Time) for each of the plurality of peripheral devices, a standard deviation of RSSI (Received Signal Strength Indication) for each of the plurality of peripheral devices, and a covariance of RTT and RSSI for each of the plurality of peripheral devices, and the method further comprises:

calculating the standard deviation of RTT, the standard deviation of RSSI, and the covariance of RTT and RSSI based on a plurality of RTTs and a plurality of RSSIs acquired by repeating transmission of the encrypted heartbeat data and reception of the encrypted response message for a predetermined period in a calibration mode for each of the plurality of peripheral devices, determining whether or not to continue the calibration mode based upon movement of one of the plurality of peripheral devices, and when the calibration mode is continued, repeating the calculation of the standard deviation of RTT of the one of the plurality of peripheral devices, the standard deviation of RSSI of the one of the plurality of peripheral devices, and the covariance of RTT and RSSI of the one of the plurality of peripheral devices, and updating the plurality of statistical distribution parameters.

16. A smart entry system comprising:

a central device including processing circuitry configured to:

encrypt heartbeat data, and transmit the encrypted heartbeat data; and a peripheral device including processing circuitry configured to:

receive the encrypted heartbeat data, when the encrypted heartbeat data cannot be decrypted, end a communication connection, and when the encrypted heartbeat data can be decrypted, decrypt the encrypted heartbeat data, encrypt a response message, and transmit a radio wave including the encrypted response message to the central device, wherein the processing circuitry of the central device is further configured to:

receive the radio wave including the encrypted response message transmitted from the peripheral device, measure a value regarding the radio wave including the encrypted response message, when the encrypted response message cannot be decrypted, refuse entry, and when the encrypted response message can be decrypted:

evaluate validity of the radio wave based on (i) a plurality of different kinds of measurement result of the radio wave transmitted from the peripheral device, (ii) a plurality of statistical distribution parameters derived based on a plurality of different kinds of the measurement result for each of a plurality of peripheral devices, and (iii) a plurality of different criterion, each of the plurality of different criterion being derived based on a distribution of the plurality of different kinds of measurement result for a respective one of each of the plurality of peripheral devices acquired in advance of receiving the radio wave including the encrypted response message transmitted from the peripheral device, and each of the plurality of different criterion being specific to different peripheral devices of the plurality of peripheral devices, and determine whether or not to permit entry based on a result of the evaluation, and the plurality of statistical distribution parameters are stored as a parameter group matrix associated with an identifier of the respective one of each of the plurality of peripheral devices.

* * * * *